(12) United States Patent
Ostrosky

(10) Patent No.: US 7,567,520 B2
(45) Date of Patent: Jul. 28, 2009

(54) APPARATUS AND METHOD OF REMOTELY ENABLING A SPECIAL MODE OF OPERATION OF AN ENDPOINT IN A VOIP NETWORK

(75) Inventor: James R. Ostrosky, Gibsonia, PA (US)

(73) Assignee: Tollgrade Communications, Inc., Wilmington, DE (US)

( * ) Notice: Subject to any disclaimer, the term of this patent is extended or adjusted under 35 U.S.C. 154(b) by 815 days.

(21) Appl. No.: 11/273,742

(22) Filed: Nov. 15, 2005

(65) Prior Publication Data
US 2006/0104207 A1 May 18, 2006

Related U.S. Application Data

(60) Provisional application No. 60/628,604, filed on Nov. 17, 2004.

(51) Int. Cl.
*H04L 12/26* (2006.01)
(52) U.S. Cl. ........................... 370/252; 370/352
(58) Field of Classification Search ............. 370/241, 370/252, 249, 389, 392, 352, 235, 236
See application file for complete search history.

(56) References Cited

U.S. PATENT DOCUMENTS

| | | | |
|---|---|---|---|
| 6,112,232 A * | 8/2000 | Shahar et al. | 709/217 |
| 6,466,548 B1 | 10/2002 | Fitzgerald | |
| 7,289,449 B1 * | 10/2007 | Rubinstein et al. | 370/245 |
| 2002/0167936 A1 | 11/2002 | Goodman | |
| 2003/0115368 A1 * | 6/2003 | Wu | 709/251 |
| 2004/0073690 A1 | 4/2004 | Hepworth et al. | |
| 2006/0067237 A1 * | 3/2006 | Burns et al. | 370/241 |
| 2006/0093094 A1 * | 5/2006 | Xing et al. | 379/1.02 |

* cited by examiner

*Primary Examiner*—Brian D Nguyen
(74) *Attorney, Agent, or Firm*—The Webb Law Firm

(57) ABSTRACT

In an apparatus and method for testing a VoIP network, a special mode sequence and a telephone number are transmitted on the VoIP network. In response to the transmission of the special mode sequence and the telephone number, a network connection is established on the VoIP network. Test data is transmitted from a first endpoint of the network connection to a second endpoint of the network connection. In response to the transmission of the test data, either the same or similar test data is returned to the first endpoint. The transmitted and returned test data are processed to determine at least one of: an amount of network delay in the transmitted and returned test data, an amount of jitter in the rate of the returned test data, and an amount of lost test data between the transmitted test data and the returned test data.

16 Claims, 2 Drawing Sheets

APPARATUS AND METHOD OF REMOTELY ENABLING A SPECIAL MODE OF OPERATION OF AN ENDPOINT IN A VOIP NETWORK

CROSS REFERENCE TO RELATED APPLICATION

This application claims priority from U.S. Provisional Patent Application No. 60/628,604, filed Nov. 17, 2004, entitled "Method Of Remotely Enabling A Special Mode Of Operation Of Endpoints In A VoIP Network", which is incorporated herein by reference.

BACKGROUND OF THE INVENTION

1. Field of the Invention

The present invention relates to an apparatus and method for testing a voice over internet protocol (VoIP) network.

2. Description of Related Art

Voice over Internet Protocol (VoIP) is the newest technology available for making telephone calls. Unlike existing "copper" technology, where each customer has dedicated wires directly from their home or business to a central office or a local cabinet, VoIP relies on transmitting messages over a high-speed network, such as a coaxial cable network utilizing a cable modem, such as a DOCSIS cable modem, in the cable TV industry or a conventional telephony network utilizing a Digital Subscriber Line (DSL) modem by existing telephony providers.

Utilizing traditional copper-based telephony, phone calls are established between two telephones using analog signaling methods, called "Ear & Mouth" signaling, or E&M. This is performed by changing voltages, polarities, and transmitting DTMF (dual-tone multi-frequency) tones, which are interpreted directly by switch equipment in the central office. For example, to indicate a phone is off-hook, the E signal is connected to ground.

When using VoIP technology, since the physical wires and/or the analog signaling methods currently used by the copper technology are no longer present, the traditional analog signals must be converted into digital packets transmitted over the corresponding high-speed network. This conversion is done at customer premise equipment (CPE) sides of the network by devices known as multimedia terminal adapters (MTAs) and embedded MTAs (EMTAs). MTAs and EMTAs are also known as "endpoints." Between the endpoints of a VoIP telephone call, the digital packets are interpreted by VoIP switch equipment, such as a Call Management System (CMS), which is the equivalent of the CLASS 5 (Custom Local Area Signaling Services) switch for analog telephones residing in the central office, which is configured to properly connect the endpoints of a VoIP telephone call.

Various new, "message-based" signaling methods have been created to enable VoIP phone calls to be established. The two most popular of these methods are the Media Gateway Control Protocol (MGCP) and the Session Initiation Protocol (SIP). Another method called Network Call Signaling (NCS) has been developed specifically for the Hybrid Fiber/Coax (HFC) business. NCS is based on MGCP.

MGCP and NCS signaling methods both provide the ability for the CMS to put the endpoint into two special modes, namely, a network loopback mode and network continuity mode. Both of these modes are used for testing and diagnostic purposes at the network level to ensure that network connectivity is present and that at least one of the endpoints is performing codec (code & decode) translation properly.

A problem with the MGCP and the NCS signaling methods is that neither of these methods enable an originating endpoint of a phone call to cause a called or destination endpoint of the phone call to enter into either the network loopback mode or the network continuity mode for a particular phone call.

It would, therefore, be desirable to provide a method and apparatus that overcomes the above problems and others. Still other problems that the present invention overcomes will be apparent to those of ordinary skill in the art upon reading and understanding the following detailed description.

SUMMARY OF THE INVENTION

The invention is a method of testing a VoIP network. The method includes transmitting from an originating endpoint on a VoIP network to a call management system (CMS) on the VoIP network a special mode sequence and a telephone number of a destination endpoint on the VoIP network, wherein the CMS, the originating endpoint and the destination endpoint are each assigned a unique IP address on the VoIP network, the CMS includes a mapping between telephone numbers associated with telephones residing at said endpoints and the IP addresses assigned to said endpoints, and each endpoint does not include such mapping. Responsive to the transmission of the special mode sequence and the telephone number, one or more messages are transmitted from the CMS onto the VoIP network for causing the originating endpoint and the destination endpoint to establish a network connection with each other via the VoIP network. After the network connection is established, a message is transmitted from the CMS onto the VoIP network for causing the destination endpoint to enter into a test mode corresponding to the transmitted special mode sequence. One or more data packets are then transmitted on the VoIP network from the originating endpoint to the destination endpoint via the network connection. One or more of either the same or similar transmitted data packets are received back at the originating endpoint from the destination endpoint via the VoIP network. The transmitted and received data packets are compared to determine at least one of network delay, jitter and packet loss.

The method can further include receiving one or more of the transmitted data packets at the destination endpoint, and transmitting one or more of the same data packets received at the destination endpoint back to the originating endpoint via the network connection.

The method can also include decoding one or more of the transmitted data packets into a corresponding analog signal or portion thereof at the destination endpoint, re-coding each of one or more of the decoded analog signals or portions thereof into a data packet that is similar to the corresponding decoded data packet at the destination endpoint, and transmitting said similar data packet from the destination endpoint to the originating endpoint.

The transmitted data packets can be pre-encoded and can be stored at the originating endpoint.

The transmission of one or more messages from the CMS onto the VoIP network can include determining at the CMS the IP address of the destination endpoint corresponding to the telephone number transmitted to the CMS, transmitting the IP address of the destination endpoint, corresponding to the telephone number transmitted to the CMS, from the CMS to the originating endpoint, transmitting the IP address of the originating endpoint from the CMS to the destination endpoint, and responsive to the originating endpoint receiving the IP address of the destination endpoint and the destination endpoint receiving the IP address of the originating endpoint, the originating endpoint and the destination endpoint establish the network connection with each other.

After comparing the transmitted and received data packets the method can include transmitting a termination message, in the form of a simulated on-hook state, from the originating endpoint to the CMS via the VoIP network. In response to the termination message, transmitting a terminate message from the CMS to each of the originating endpoint and the destination endpoint via the VoIP network. In response to the terminate messages, terminating the network connection between the originating endpoint and the destination endpoint.

The invention is also an apparatus for testing a VoIP network. The apparatus includes means for transmitting a special mode sequence and a telephone number on a VoIP network; means responsive to the transmission of the special mode sequence and the telephone number for causing a network connection to be established on the VoIP network; means for transmitting test data from a first endpoint of the network connection to a second endpoint of the network connection; means responsive to the transmission of the test data for returning either the same or similar test data to the first endpoint; and means for processing the transmitted and returned test data to determine at least one of: an amount of network delay in the transmitted and returned test data, an amount of jitter in the rate of the returned test data, and an amount of lost test data between the transmitted test data and the returned test data.

The same test data can be the transmitted test data echoed back to the first endpoint. In contrast, the similar test data can be a copy or reproduction of the transmitted test data.

The means for returning can include means for decoding transmitted test data into analog test data, and means for coding analog test data into the copy or reproduction of the transmitted test data.

Desirably, the first and second endpoints are in a simulated on-hook state prior to establishment of the network connection.

The apparatus can further include means for causing the network connection to terminate.

Lastly, the invention is a method of testing a VoIP network comprising: (a) transmitting a special mode sequence and a telephone number on a VoIP network; (b) in response to the transmission of the special mode sequence and the telephone number, establishing a network connection on the VoIP network; (c) transmitting test data from a first endpoint of the network connection to a second endpoint of the network connection; (d) in response to the transmission of the test data, returning either the same or similar test data to the first endpoint; and (e) processing the transmitted and returned test data to determine at least one of: an amount of network delay in the transmitted and returned test data, an amount of jitter in the rate of the returned test data, and an amount of lost test data between the transmitted test data and the returned test data.

The same test data can be the transmitted test data echoed back to the first endpoint. The similar test data can be a copy or reproduction of the transmitted test data.

Step (d) of the method can include decoding transmitted test data into analog test data, and coding the analog test data into the copy or reproduction of the transmitted test data.

The method can further include the first and second endpoints entering into a simulated off-hook state prior to establishment of the network connection.

Lastly, the method can include causing the network connection to terminate.

DETAILED DESCRIPTION OF THE INVENTION

Figure 1:
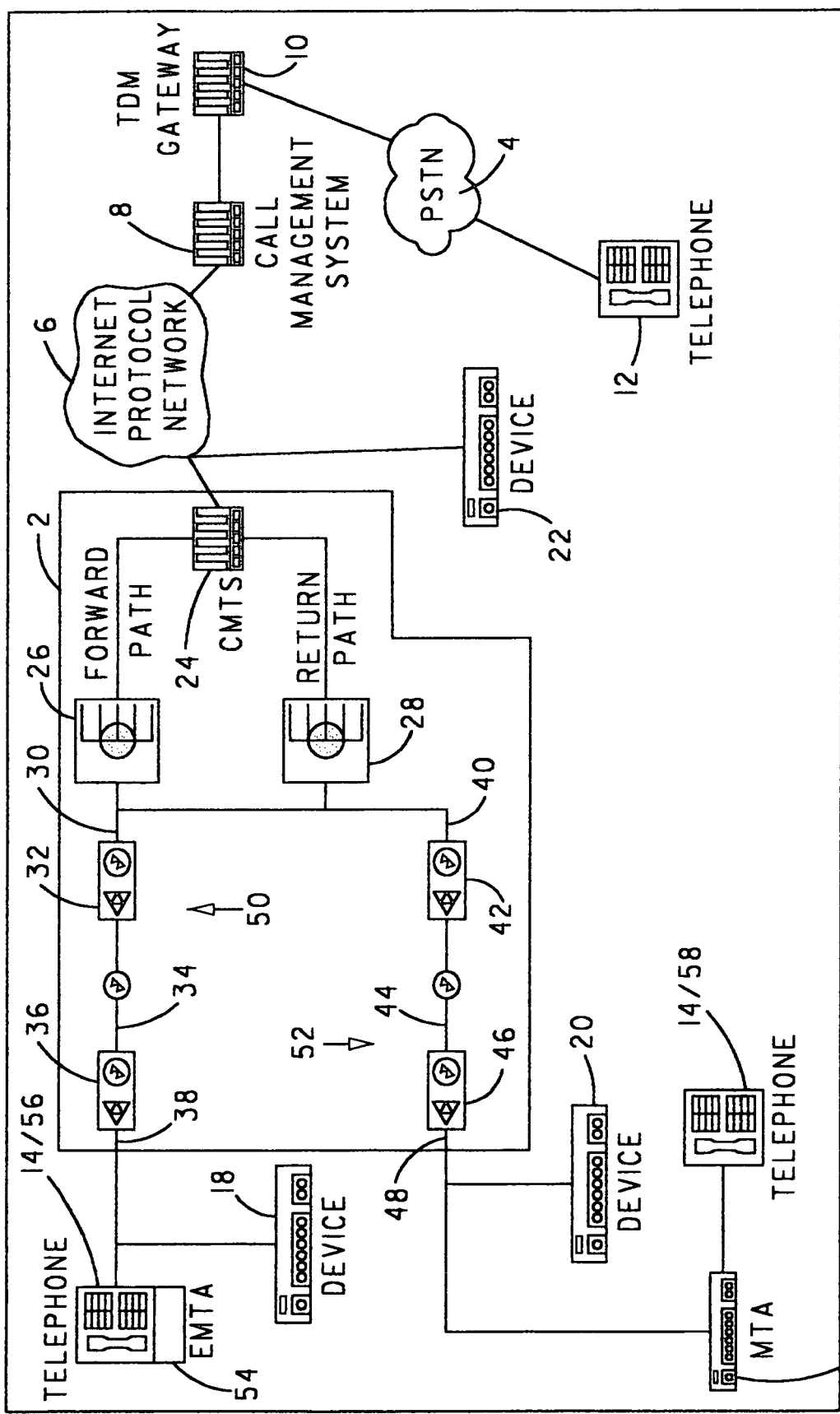
FIG. 1 is a block diagram of a VoIP network that includes a number of test devices for testing the capacity of the VoIP network to handle telephone calls.

With reference to FIG. 1, a VoIP network 1 includes a cable Hybrid-Fiber Coax (HFC) plant 2 utilizes the NCS (or any other suitable) call signaling method coupled to a public switched telephone network (PSTN) 4 via an Internet Protocol (IP) Network 6, a call management system (CMS) 8 and a time-division multiplexed (TDM) gateway 10. Since the hardware that comprises HFC plant 2 is well-known to those skilled in the art, details regarding this hardware and/or its operation will not be described herein for purpose of simplicity. While FIG. 1 shows HFC plant 2, HFC plant 2 can be converted into a DSL plant simply by substituting a Digital Subscriber Line Access Multiplexor (DSLAM) for the cable modem termination system (CMTS) 24 of HFC plant 2 and by substituting a DSL modem for each cable modem (not shown) on the network. For purpose of describing the present invention, HFC plant 2 will be utilized hereinafter. However, it is to be appreciated that a DSL plant can be substituted for HFC plant 2 in the following description.

HFC plant 2 also includes a forward path combiner 26, a return path splitter 28, coaxial cable plants 30, 38, 40 and 48, optical nodes (or transceivers) 32, 36, 42 and 46, and fiber optic plants 34 and 44 all connected as shown.

The combination of coaxial cable plant 30, optical node 32, fiber optic plant 34, optical node 36, and at least part of coaxial cable plant 38 comprises a first communication path 50 of HFC plant 2 connected to forward path combiner 26 and return path splitter 28, while the combination of coaxial cable plant 40, optical node 42, fiber optic plant 44, optical node 46 and at least part of coaxial cable plant 48 comprises a second communication path 52 of HFC plant 2 that is connected to forward path combiner 26 and return path splitter 28.

The illustration of HFC plant 2 as having first and second communication paths 50 and 52, however, is not to be construed as limiting the invention since HFC plant 2 can have any number of communication paths, including only one communication path, as deemed necessary by one skilled in the art. Since the operation of CMTS 24, combiner 26, splitter 28 and optical nodes 32, 36, 42 and 46 are well-known in the art, details regarding each of their operation will not be described in detail herein.

Each coaxial cable plant 30, 38, 40 and 48 includes any suitable combination of coaxial cables and hardware deemed necessary by one skilled in the art in order to facilitate its function. Similarly, each fiber optic plant 34 and 44 includes any suitable combination of fiber optic cables and hardware deemed necessary by one skilled in the art in order to implement its function. Since the hardware necessary to implement each fiber optic plant 34 and 44, and each coaxial cable plant 30, 38, 40 and 48 can be readily selected by one skilled in the art, details regarding the specific implementation of each of these plants will not be described herein for purpose of simplicity.

In normal operation, one or more telephones 12 coupled to PSTN 4 can communicate analog voice data via PSTN 4, TDM gateway 10, CMS 8, IP network 6 and HFC plant 2 with one or more telephones 14 coupled to HFC plant 2 either via an MTA 16 or directly (when a telephone 14 includes an embedded MTA (EMTA 54)). Similarly, each telephone 14 can communicate analog voice data with a telephone 12 via HFC plant 2, IP network 6, CMS 8, TDM gateway 10 and PSTN 4.

Moreover, each telephone 14 coupled to HFC plant 2 can communicate analog voice data with another telephone 14 coupled to HFC plant 2 via the internal components thereof. For the purpose of describing the present invention, it will be assumed each telephone 14 is located at a different customer premise. For example, telephone 14 coupled to coaxial cable plant 38 resides at a first customer premise 56 while telephone 14 coupled to coaxial cable plant 48 resides at a second customer premise 58. However, this is not to be construed as limiting the invention since two or more telephones, each having a different network address, can reside at a single customer premise.

Test devices 18, 20 and 22 can be coupled to various inputs/outputs of HFC plant 2 to facilitate testing of HFC plant 2. More specifically, test devices 18, 20 and 22 can be communicatively paired together, e.g., (18, 20), (18, 22) or (20, 22), for testing the portion of HFC plant 2 therebetween in a manner known in the art. Since the use of test devices 18, 20 and 22 for testing portions of HFC plant 2 is not part of the present invention, additional detail regarding the operation of test devices 18, 20 and 22 for testing portions of HFC plant 2 will not be described herein for purpose of simplicity.

In the embodiment of VoIP network 1 shown in FIG. 1, the location of each telephone 14, MTA 16 and devices 18 and 20 is not to be construed as limiting the invention since they can be connected anywhere along the length of their respective coaxial cable networks. Moreover, the illustration of a single telephone 14 connected to each coaxial cable network 38 and 48 is not to be construed as limiting the invention since a plurality of telephones 14 can be connected to each coaxial cable network 38 and 48 provided each telephone has a unique IP address. Regarding the location of test devices 18 and 20, each of these devices can be connected anywhere along the length of their respective coaxial cable network. For example, device 18 can be connected adjacent optical node 36 as shown, adjacent the terminal end of coaxial cable plant 38 opposite optical node 36, or anywhere between. Similar comments apply in respect of the connection of test device 20 to coaxial cable plant 48.

A cable modem (not shown) can be connected between HFC plant 2 and MTA 16. A cable modem (not shown) can also be connected between each test device 18, 20 and 22 and HFC plant 2. Alternatively, each of test device 18, test device 20, test device 22 and/or MTA 16 can have a cable modem embedded therein whereupon the need for a separate cable modem to facilitate communication with HFC plant 2 is avoided. Each of these cable modems facilitate communication between MTA 16, test device 18, test device 20 or test device 22 and CMTS 24.

Figure 2:
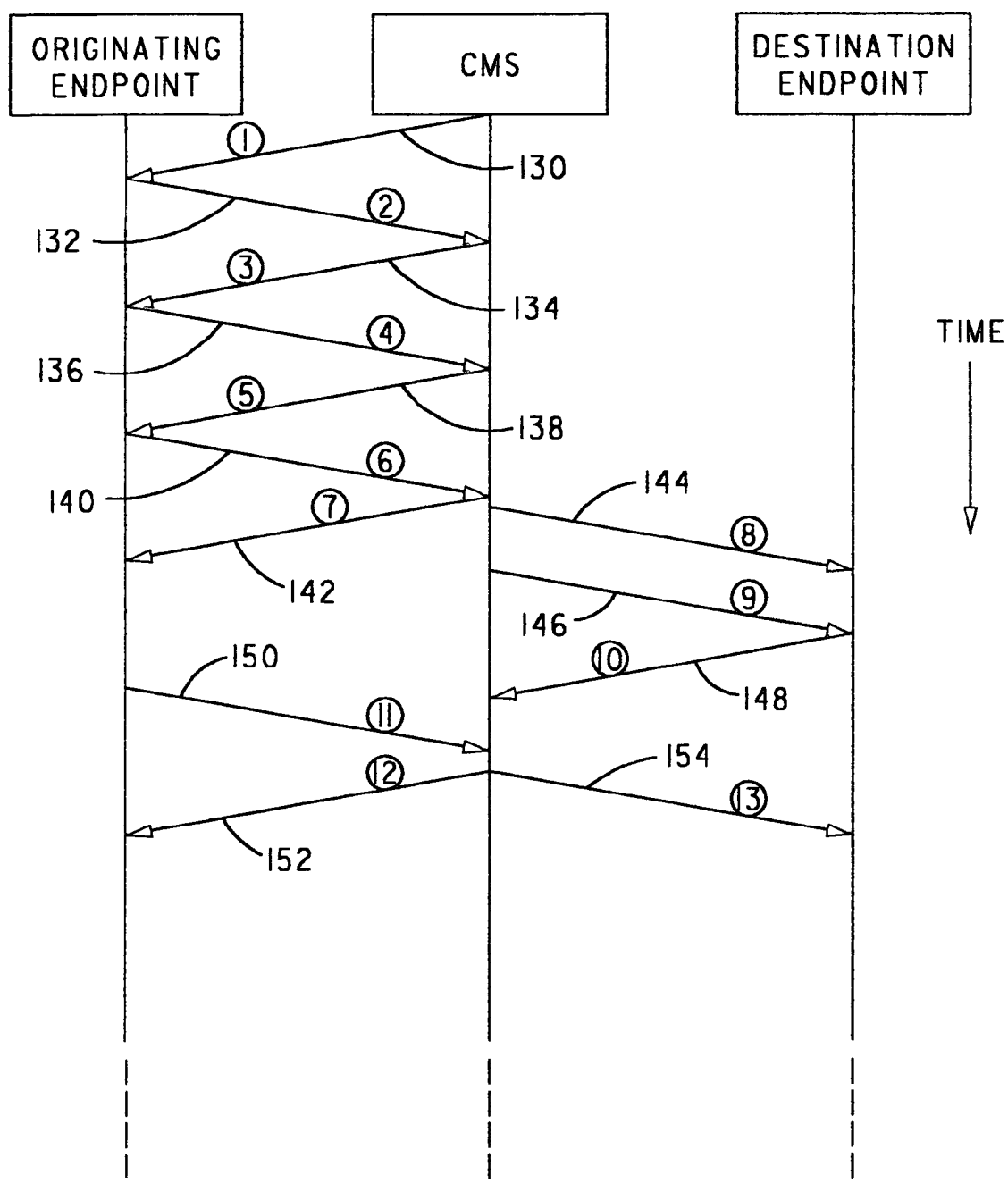
FIG. 2 is a diagram of a sequence of messages transmitted between an originating test device, a destination test device and/or a call management system (CMS) of the VoIP network shown in FIG. 1 to facilitate testing at least a portion of the VoIP network between the originating test device and the destination test device.

With reference to FIG. 2 and with continuing reference to FIG. 1, prior to the initiation of testing VoIP network 1, each endpoint is in an on-hook state and CMS 8 knows the on-hook/off-hook state of each endpoint by way of one or more messages passed between CMS 8 and each endpoint via VoIP network 1. These messages will not be described herein in detail for purpose of simplicity. At a suitable time when it is desired to initiate the testing of VoIP network 1 between any two or more of TDM gateway 10, telephone 14 of customer premise 58, telephone 14 of customer premise 56, or test device 18, 20 or 22, CMS 8 transmits a first message 130 to a so-called originating endpoint of a VoIP network, such as test device 18, 20 or 22, telephone 14 of customer premise 58, telephone 14 of customer premise 56, or TDM gateway 10 servicing telephone 12 via PSTN 4. First message 130 is a packet of data that includes a sequence of characters that indicate to the originating endpoint that CMS 8 is standing by to receive from the originating endpoint a message that the originating endpoint has entered the simulated off-hook state. First message 130 also includes the IP address of the originating endpoint to facilitate routing of first message 130 to the originating endpoint. For purpose of describing the present invention, it will be assumed hereinafter that each message is one or more packets of data that includes a sequence of characters. More specifically, each message described herein may comprise a single data packet or series of data packets, each of which includes a portion of the data (sequence of characters) comprising the overall message.

A destination endpoint, such as test device 18, 20 or 22, telephone 14 or TDM gateway 10 servicing telephone 12 via PSTN 4, may be controlled by CMS 8 in the same manner as the originating endpoint, or each may be serviced by a completely different CMS. Herein, the originating endpoint and the destination endpoints are different apparatus having different unique IP addresses associated therewith. Since signaling between each CMS and an endpoint or another CMS is well-known in the art, such signaling will not be described in detail herein for purpose of simplicity. Generally, however, from the perspective of HFC network 2 and IP network 6, devices 18, 20 and 22, telephone 14, TDM gateway 10 (servicing telephone 12 via PSTN 4) and CMS 8 are network devices, each of which has a unique IP address associated therewith.

In accordance with the present invention, an originating endpoint can cause a destination endpoint to enter into two different, mutually exclusive, special modes, namely, special mode 1 comprising an endpoint request for network loopback mode and special mode 2 comprising an endpoint request for network continuity mode, for testing purposes.

More specifically, after the originating endpoint has received first message 130, when it is desired that the originating endpoint cause a destination endpoint to enter into one of the special modes described above, the originating endpoint enters a simulated off-hook state and transmits a second message 132 to CMS 8. Second message 132 is a packet of data that includes a sequence of characters that indicate to CMS 8 that the originating endpoint has entered the simulated off-hook state. In addition, second message 132 includes the IP address of CMS 8 that facilitates routing of second message 132 to CMS 8. Hereinafter, it is to be understood that the IP address included in each message facilitates the routing thereof on VoIP network 1 to the apparatus assigned said IP address on VoIP network 1.

Herein, each originating endpoint and/or destination endpoint enters a simulated off-hook state to facilitate automated remote testing thereof under the control of CMS 8. The use of a simulated off-hook state avoids the need for a user to be present at the originating endpoint and/or the destination endpoint to lift the handset of a physical telephone from its hook whereupon a physical signal corresponding to the off-hook event is generated at the endpoint and converted into data that is transmitted as part of a message over VoIP network 1. This is particularly useful when an endpoint apparatus on VoIP network 1 does not include a physical telephone handset, e.g., test devices 18, 20 and 22.

In response to receiving second message 132, CMS 8 transmits a third message 134 to the originating endpoint. Third message 134 includes the IP address of the originating endpoint and a sequence of characters that indicate to the originating endpoint that CMS 8 is standing by to receive from the originating endpoint a message that includes a sequence of characters being "dialed" at the originating endpoint. This sequence of characters, to be transmitted by the originating endpoint to CMS 8, can include (a) the phone number of a destination endpoint, (b) a sequence of prefix characters requesting a special mode of operation, as know as., a special mode sequence of prefix characters and/or (c) a sequence of characters that indicate to CMS 8 that the originating endpoint is 'on-hook'.

In response to receiving third message 134, the originating endpoint transmits a fourth message 136 that includes the IP address of CMS 8. Assuming the originating endpoint desires to cause a destination endpoint to enter into one of the special modes described above, fourth message 136 also includes the special mode sequence of prefix characters, e.g., without limitation, *99. Fourth message 136 is also known as a special mode request.

In response to receiving fourth message 136, CMS 8 interprets the special mode sequence of prefix characters as an indication for CMS 8 to request the destination endpoint to be identified in the phone number included in a sixth message 140 (described hereinafter) to be placed in the special mode indicated by the special mode sequence of prefix characters. CMS 8 responds to the special mode sequence of prefix characters by transmitting a fifth message 138 that includes the IP address of the originating endpoint and a sequence of characters that indicate to the originating endpoint that CMS 8 is standing by to receive from the originating endpoint a message that includes a sequence of characters i.e., the phone number, of the destination endpoint being "dialed" at the originating endpoint or that indicate to the originating endpoint that CMS 8 has rejected the request from the originating endpoint for CMS 8 to treat fourth message 136 as a special mode request. Exemplary reasons for rejecting the special mode request can include, without limitation: the originating endpoint is not permitted to request the special mode, e.g., based on the caller ID of the originating endpoint transmitted to CMS 8 in one of the foregoing messages or in messages not described herein, or the wrong time of day.

In response to receiving fifth message 138 including the instruction to transmit the phone number to CMS 8, the originating endpoint transmits sixth message 140 that includes the IP address of CMS 8 and the phone number of the destination endpoint.

In response to receiving sixth message 140, CMS 8 causes a network connection to be established between the originating endpoint and the destination endpoint residing on the network at the IP address that corresponds to the phone number included in sixth message 140. To facilitate the creation of this network connection, CMS 8 references and extracts from a relational database that includes a mapping between telephone numbers and IP addresses on the VoIP network 1, the IP address of the destination endpoint corresponding to the phone number of the destination endpoint included in sixth message 140.

If CMS 8 decides to act affirmatively on fourth message 136 and on sixth message 140, CMS 8 transmits to the originating endpoint a seventh message 142 that includes the IP address of the destination endpoint extracted from the database and transmits to the destination endpoint an eighth message 144 that includes the IP address of the originating endpoint. Seventh message 142 and eighth message 144 also include one or more sequences of characters that act as a message or messages for causing the originating endpoint and the destination endpoint, respectively, to establish a network communication connection with each other in a manner well-known to those skilled in the art (see e.g., PacketCable™ Network-Based Call Signaling Protocol Specification PKT-SP-EC-MGCP-110-040402, Copyright 1999-2004 Cable Television Laboratories, Inc.).

However, if CMS 8 rejects the special mode request, i.e., decides to act negatively on fourth message 136, fifth message 138 transmitted by CMS 8 will include the IP address of the originating endpoint and a sequence of characters that indicates to the originating endpoint that its request to establish a network communication connection has been rejected. In response to receiving this fifth message 138, the originating endpoint can output a suitable notification to the user thereof. Exemplary reasons for rejecting the request can include, without limitation: the phone number of the destination endpoint is not received by CMS 8 within a predetermined time after receipt of the special mode sequence of prefix characters, or the destination endpoint has been designated in a storage accessible to CMS 8 as not being permitted to enter the requested mode. If fifth message 138 includes a sequence of characters that indicates to the originating endpoint that its request to establish a network communication has been rejected, the process of establishing a network communication connection between the originating endpoint and the destination endpoint and the subsequent entry of the destination endpoint into the special mode is terminated. For purpose of describing the present invention, it will be assumed herein that CMS 8 transmits fifth message 138, seventh message 142 and eighth message 144 described above to cause the originating and destination endpoints, respectively, to establish the network communication connection therebetween.

At a suitable time after the originating endpoint and the destination endpoint have established the network communication connection, CMS 8 transmits a ninth message 146 that includes the IP address of the destination endpoint and a sequence of characters that cause the destination endpoint to enter the special mode indicated by the special mode sequence of prefix characters included in fourth message 136 transmitted by the originating endpoint to CMS 8. Thus, for example, if the special mode sequence included the prefix characters corresponding to special mode 1, the destination endpoint enters into the network loopback mode of operation. Alternatively, if the special mode sequence included the prefix digits corresponding to special mode 2, the destination endpoint enters into the network continuity mode of operation. Depending on the implementation of CMS 8, the control functions implemented by eighth message 144 and ninth message 146 can be merged into a single message, e.g., eighth message 144 or ninth message 146, whereupon the need for separate messages 144 and 146 is avoided.

In response to receiving ninth message 146, the destination endpoint transmits a tenth message 148 that includes the IP address of CMS 8 and a sequence of characters that indicate to CMS 8 that the request to enter the special mode has been accepted or rejected. An exemplary reason for rejection includes, without limitation, the destination endpoint lacks the ability to enter the requested mode. For purpose of describing the present invention hereinafter, it will be assumed that the special mode request has been accepted by the destination endpoint.

Since the originating endpoint and the destination endpoint have established the network communication connection with each other and since the destination endpoint has entered the requested special mode, the originating endpoint can transmit packets of data stored thereat, e.g., data corresponding to an analog telephone call, to the destination endpoint without the intervention of CMS 8 utilizing the IP address of the destination endpoint transmitted to the originating endpoint by CMS 8. Similarly, the destination endpoint can transmit packets of data to the originating endpoint without the intervention of CMS 8 utilizing the IP address of the originating endpoint transmitted to the destination endpoint by CMS 8. Details regarding the packets of data corresponding to a telephone call in connection with the network loopback mode of operation or the network continuity mode of operation will not be described herein for purpose of simplicity.

In the network loopback mode of operation, the originating endpoint transmits one or more data packets to the destination endpoint. The destination endpoint echoes or transmits back to the originating endpoint the one or more of the same data packets received by the destination endpoint from the originating endpoint. The originating endpoint compares each transmitted data packet to the corresponding echoed data packet received from the destination endpoint. If the two data packets match, the destination endpoint and/or the network between the originating endpoint and the destination endpoint is/are deemed to be operating properly. Otherwise, the destination endpoint and/or the network between the originating endpoint and the destination endpoint may be faulty whereupon further testing may be required. The originating endpoint can also include suitable hardware and/or software for determining the delay between the transmission of one or more data packets and the receipt of the corresponding echoed data packets received from the destination endpoint, a.k.a., network delay, jitter resulting from variations in the frequency of echoed data packets received from the destination endpoint and the loss of any data packets, a.k.a, packet loss.

In the network continuity mode of operation, the originating endpoint transmits one or more data packets stored thereat to the destination endpoint. The destination endpoint echoes a copy or reproduction of one or more of the received data packets back to the originating endpoint after passing it through the destination endpoint's internal equipment to verify proper operation. More specifically, each data packet received by the destination endpoint is decoded into a corresponding analog audio signal, or portion thereof, which is then re-coded back into a similar data packet, desirably a copy of the corresponding received data packet, utilizing an internal codec (code & decode) of the destination endpoint. The re-coded data packet is then transmitted back to the originating endpoint which compares it to the originally transmitted data packet. If the two data packets have a predetermined relation to each other, e.g., without limitation, the two data packets match, the destination endpoint and/or the network between the originating endpoint and destination endpoint is/are deemed to be operating properly. Otherwise, the destination endpoint and/or the network between the originating endpoint and the destination endpoint may be faulty whereupon further testing may be required. The originating endpoint can also determine the delay between the transmission of one or more data packets and the receipt of one or more corresponding similar data packets received from the destination endpoint, a.k.a., network delay, jitter resulting from variations in the frequency of echoed data packets received from the destination endpoint and the loss of any data packets, a.k.a., packet loss.

In the network continuity mode of operation, the audio signal, or portion thereof, is not received by a telephone associated with the destination endpoint regardless of the current hook-state of the telephone handset, i.e., on-hook or off-hook. Moreover, any other physical connections to the destination endpoint are not affected by the network loopback mode or network continuity mode of operation.

Once a destination endpoint is in either the network loopback mode or the network continuity mode of operation, it remains in this mode of operation At a suitable time when it is desired to release the destination endpoint from the network loopback mode or the network continuity mode of operation, the originating endpoint transmits an eleventh message (test termination) 150 including the IP address of CMS 8 and a sequence of characters that cause CMS 8 to initiate termination of the special mode of operation. In one non-limiting embodiment, the sequence of characters forming eleventh message 150 is a sequence of characters that indicates that originating endpoint has entered a simulated on-hook state. In response to receiving eleventh message 150, CMS 8 transmits a twelfth message 152 including the IP address of the originating endpoint and a sequence of characters that cause the originating endpoint to delete the connection to the destination endpoint and terminate testing in accordance with the network loopback mode or the network continuity mode of operation. Eleventh message 150 also causes CMS 8 to transmit a thirteenth message 154 including the IP address of the destination endpoint and a sequence of characters that cause the destination endpoint to delete the connection to the originating endpoint and to terminate the network loopback mode or the network continuity mode of operation. In response to receiving twelfth message 152 and thirteenth message 154, the originating endpoint and the destination endpoint, respectively, terminate the network loopback mode or the network continuity mode of operation. Thereafter, at suitable times, the originating endpoint and the destination endpoint each enter a simulated on-hook state and transmit messages (not shown) including the IP address of CMS 8 and the sequence of characters that inform CMS 8 that the originating endpoint and the destination endpoint have both entered the simulated on-hook state.

As can be seen, the present invention enables a VoIP provider to have an originating endpoint cause a destination endpoint to enter into a special mode of operation without special equipment, thereby allowing access to test capabilities that previously could not be accessed from the originating endpoint.

The present invention has been described with reference to the preferred embodiment. Obvious modifications and alterations will occur to others upon reading and understanding the preceding detailed description. For example, the various names utilized to describe the various messages are not to be construed as limiting the invention. Moreover, the number or quantity of messages described above is not to be construed as limiting the invention since this number or quantity can be modified as necessary by one of ordinary skill in the art in a manner to realize the present invention. It is intended that the invention be construed as including all such modifications and alterations insofar as they come within the scope of the appended claims or the equivalents thereof.

The invention claimed is:

1. A method of testing a VoIP network comprising:
   (a) transmitting from an originating endpoint on a VoIP network to a call management system (CMS) on the VoIP network a special mode sequence and a telephone number of a destination endpoint on the VoIP network, wherein:
      the CMS, the originating endpoint and the destination endpoint are each assigned a unique IP address on the VoIP network; and
      the CMS includes a mapping between telephone numbers associated with telephones residing at said endpoints and the IP addresses assigned to said endpoints, and each endpoint does not include such mapping;
   (b) responsive to the transmission in step (a), transmitting one or more messages from the CMS onto the VoIP network that cause the originating endpoint and the destination endpoint to establish a network connection with each other via the VoIP network;
   (c) after step (b), transmitting a message from the CMS onto the VoIP network that causes the destination endpoint to enter into a test mode corresponding to the special mode sequence transmitted in step (b);
   (d) transmitting on the VoIP network one or more data packets from the originating endpoint to the destination endpoint via the network connection;
   (e) receiving one or more of either the same or similar data packets transmitted in step (d) back at the originating endpoint from the destination endpoint via the VoIP network; and
   (f) comparing the transmitted and received data packets to determine at least one of network delay, jitter and packet loss.

2. The method of claim 1, further including between steps (d) and (e):
   receiving one or more of the data packets transmitted in step (d) at the destination endpoint; and
   transmitting one or more of the same data packets received at the destination endpoint back to the originating endpoint via the network connection.

3. The method of claim 1, further including between steps (d) and (e):
   decoding one or more of the data packets transmitted in step (d) into a corresponding analog signal or portion thereof at the destination endpoint;
   re-coding each of one or more of the decoded analog signals or portions thereof into a data packet that is similar to the corresponding decoded data packet at the destination endpoint; and
   transmitting said similar data packet from the destination endpoint to the originating endpoint.

4. The method of claim 1, wherein the data packets transmitted in step (d) are stored at the originating endpoint.

5. The method of claim 1, wherein step (b) includes:
   determining at the CMS the IP address of the destination endpoint corresponding to the telephone number transmitted to the CMS;
   transmitting the IP address of the destination endpoint, corresponding to the telephone number transmitted to the CMS, from the CMS to the originating endpoint;
   transmitting the IP address of the originating endpoint from the CMS to the destination endpoint; and
   responsive to the originating endpoint receiving the IP address of the destination endpoint and the destination endpoint receiving the IP address of the originating endpoint, the originating endpoint and the destination endpoint establish the network connection with each other.

6. The method of claim 1, further including, following step (f), the steps of:
   transmitting a test termination message from the originating endpoint to the CMS via the VoIP network;
   responsive to the test termination message, transmitting a terminate test message from the CMS to each of the originating endpoint and the destination endpoint via the VoIP network; and
   responsive to the terminate test messages, terminating the network connection between the originating endpoint and the destination endpoint.

7. An apparatus for testing a VoIP network comprising:
   means for transmitting a special mode sequence and a telephone number on a VoIP network;
   means responsive to the transmission of the special mode sequence and the telephone number for causing a network connection to be established on the VoIP network;
   means for transmitting test data from a first endpoint of the network connection to a second endpoint of the network connection;
   means responsive to the transmission of the test data for returning either the same or similar test data to the first endpoint; and
   means for processing the transmitted and returned test data to determine at least one of: an amount of network delay in the transmitted and returned test data, an amount of jitter in the rate of the returned test data, and an amount of lost test data between the transmitted test data and the returned test data.

8. The apparatus of claim 7, wherein:
   the same test data is the transmitted test data echoed back to the first endpoint; and
   the similar test data is copy or reproduction of the transmitted test data.

9. The apparatus of claim 8, wherein the means for returning includes:
   means for decoding transmitted test data into analog test data; and
   means for coding analog test data into the copy or reproduction of the transmitted test data.

10. The apparatus of claim 7, wherein the first and second endpoints are in a simulated on-hook state prior to establishment of the network connection.

11. The apparatus of claim 7, further including means for causing the network connection to terminate.

12. A method of testing a VoIP network comprising:
   (a) transmitting a special mode sequence and a telephone number on a VoIP network;
   (b) in response to the transmission of the special mode sequence and the telephone number, establishing a network connection on the VoIP network;
   (c) transmitting test data from a first endpoint of the network connection to a second endpoint of the network connection;
   (d) in response to the transmission of the test data, returning either the same or similar test data to the first endpoint; and
   (e) processing the transmitted and returned test data to determine at least one of: an amount of network delay in the transmitted and returned test data, an amount of jitter in the rate of the returned test data, and an amount of lost test data between the transmitted test data and the returned test data.

13. The method of claim 12, wherein:
the same test data is the transmitted test data echoed back to the first endpoint; and
the similar test data is a copy or reproduction of the transmitted test data.

14. The method of claim 13, wherein step (d) includes:
decoding transmitted test data into analog test data; and
coding the analog test data into the copy or reproduction of the transmitted test data.

15. The method of claim 12, further including the first and second endpoints entering into a simulated off-hook state prior to establishment of the network connection.

16. The method of claim 12, further including causing the network connection to terminate.

* * * * *